United States Patent [19]

Ferrari

[11] 3,833,758

[45] Sept. 3, 1974

[54] VIDEO INFORMATION RECORDING AND DISPLAY

[75] Inventor: Leonard A. Ferrari, San Clemente, Calif.

[73] Assignee: Bell & Howell Company, Chicago, Ill.

[22] Filed: July 7, 1972

[21] Appl. No.: 269,644

[52] U.S. Cl. ................ 178/6.8, 178/7.89, 178/7.91, 178/69.5 TV, 178/DIG. 24

[51] Int. Cl. .......................... H04n 5/78, H04n 7/18

[58] Field of Search ......... 178/6.8, DIG. 1, DIG. 24, 178/69.5 TV, 6.6 A

[56] References Cited

UNITED STATES PATENTS

| | | | |
|---|---|---|---|
| 2,960,566 | 11/1960 | Athey | 178/DIG. 24 |
| 3,175,035 | 3/1965 | MacDonald | 178/6.6 A |
| 3,196,207 | 7/1965 | Davies | 178/6.8 |
| 3,610,820 | 10/1971 | Lund | 178/DIG. 1 |
| 3,641,265 | 2/1972 | Ganske | 178/69.5 TV |

*Primary Examiner*—Howard W. Britton
*Attorney, Agent, or Firm*—Benoit Law Corporation

[57] ABSTRACT

Several video recording and playback methods and apparatus are disclosed in which played-back video information is displayed to a video camera which, in turn, produces electrical video signals for display by a video display set, such as a conventional television receiver. The video camera may operate at different scanning rates during recording and during playback. The device that displays the played-back video information to the camera may operate at a scanning rate different from the camera's scanning rate during playback. Also, the device for displaying the played-back video information to the camera may be synchronized by played-back synchronization information which is affected by timing errors. No automatic frequency control is then employed in the particular display device.

26 Claims, 9 Drawing Figures

VIDEO INFORMATION RECORDING AND DISPLAY

BACKGROUND OF THE INVENTION

1. Field of the Invention

The subject invention relates to the recording and to the display of video information.

2. Description of the Prior Art

Recent years have seen an increasing sophistication of video recording and display methods and apparatus. However, despite tremendous efforts, the television equipment industry still has not been able to place video recording and playback equipment within the reach of the public at large. Few institutions are even fewer individuals can afford to equip themselves with video recording and playback apparatus.

Existing approaches to the problem call for equipment which has to meet very high quality requirements and which for that reason is bound to be expensive and complicated. Existing approaches also require equipment with extremely high bandwidth handling capability.

SUMMARY OF THE INVENTION

It is an object of this invention to overcome the above mentioned disadvantages.

It is another object of this invention to exploit interrelationships of recording and reproduction bandwidths scanning rates and perceptive phenomena to provide improved video recording and display methods and apparatus.

It is a related object of this invention to reduce cost and complexity of video recording and reproducing equipment.

It is another object of the invention to improve the reliability of vieo recording and reproducing methods and equipment.

It is a further object of the invention to improve the quality of recorded and reproduced video presentations.

Other objects of this invention will become apparent in the further course of this disclosure.

From one aspect thereof, this invention resides in a method of recording and subsequently displaying video information, and in particular in the improvement comprising in combination the steps of providing an apparatus for recording and reproducing video information contained in electric signals, providing a first video display device, providing a second video display device separate from said first video display device, providing a video camera, employing said video camera for generating first electric signals containing video information, employing said first video display device for viewing said video information during generation of said first electric signals, employing said apparatus for recording said video information contained in said first electric signals, employing said apparatus for subsequently reproducing said recorded video information, employing said first video display device for displaying said reproduced video information, employing said video camera for generating second electric signals substantially containing said displayed reproduced video information, and employing said second video display device for displaying said video information contained in said second electric signals.

From a further aspect thereof, this invention resides in a method of recording and subsequently displaying video information, and in the improvement comprising in combination the steps of providing an apparatus for recording and reproducing video information contained in electric signals, providing a first video display device, providing a second video display device separate from said first video display device, providing a video camera, employing said video camera for generating first electric signals containing video information and operating said video camera at a first scanning rate during generation of said first electric signals, employing said apparatus for recording said video information contained in said first electric signals, employing said apparatus for subsequently reproducing said recorded video information, employing said first video display device for displaying said reproduced video information and operating said first video display device at said first scanning rate during display of said reproduced video information, employing said video camera for generating second electric signals substantially containing said displayed reproduced video information and operating said video camera at a second scanning rate, being higher than said first scanning rate, during generation of said second electric signals, and employing said second video display device for displaying said video information contained in said second electric signals and operating said second video display device at said second scanning rate during display of said video information contained in said second electric signals.

From another aspect thereof, this invention resides in apparatus for recording video information and subsequently displaying said video information with a video display apparatus. The invention according to this aspect resides more specifically in the improvement comprising, in combination, means for recording and reproducing video information contained in electric signals, a video display device separate from said video display apparatus, a video camera for generating first electric signals containing video information, means for selectively connecting said video display device to said video camera for a display of said video information during generation of said first electric signals, means for selectively connecting said recording means to said camera for a recording of said video information contained in said first electric signals, means for switching said recording means to a reproducing mode of operation for reproducing said recorded video information, means for selectively connecting said video display device to said recording means for a display of said reproduced video information by said video display device, means for optically coupling said video camera to said video display device for generating second electric singals substantially containing said · displayed reproduced video information, and means for applying said second electric signal to said video display apparatus for a display of said video information contained in said second electric signals.

From a further aspect thereof, this invention resides in apparatus for recording and subsequently displaying video information, and, more particularly, in the improvement comprising, in combination, means for recording and reproducing video information contained in electric signals, a video camera for generating first electric signals containing video information, means for operating said video camera at a first scanning rate during generation of said first electric signals, a first video display device for displaying reproduced video information, means for operating said first video display device at said first scanning rate during display of said reproduced video information, means for optically coupling said video camera to said first video display device for a generation of electric signals substantially containing said displayed reproduced video information, means for operating said optically coupled video camera at a second scanning rate, being higher than said first scanning rate, during generation of said second electric signals, a second video display device for displaying said video information contained in said second electric signals, and means for operating said second video display device at said second scanning rate during display of said video information contained in said second electric signals.

BRIEF DESCRIPTION OF THE DRAWINGS

The invention and its various aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
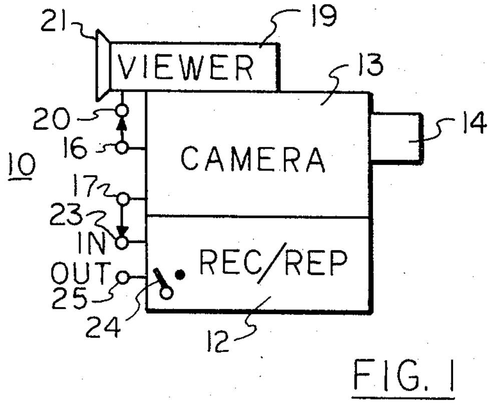
FIGS. 1 and 2 are block diagrams of video recording and reproducing methods and equipment in accordance with a preferred embodiment of the subject invention.
Figure 2:
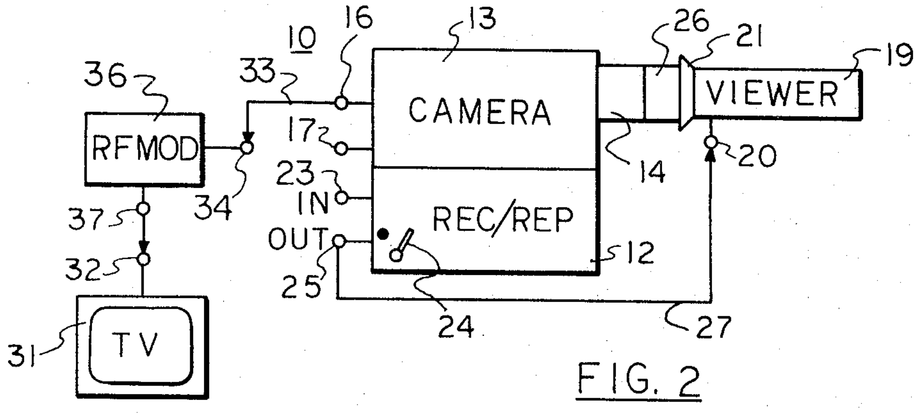

The video recording and playback apparatus of FIGS. 1 and 2 includes a video tape recorder 12 which may be of a conventional type. By way of example and not by way of limitation, magnetic video tape recorders are preferred in the practice of the subject invention since they permit an instant replay of recorded information as well as a subsequent re-use of the recording medium. The apparatus 10 also includes a video camera 13 which may be of a conventional type.

The camera 13 has a lens system 14 for picking up video scenes to be recorded. In accordance with conventional practice, the video camera 13 generates electric signals containing the video information picked up through the lens system 14. These generated signals appear at camera output terminals 16 and 17. Also in accordance with conventional practice, the generated video signals are accompanied by synchronization information which is generated by conventional synchronization equipment in the camera.

The apparatus 10 also includes a first video display device 19 which has an input 20 for receiving video signals and which includes a conventional video display device for displaying video information applied to the input 20. The video information displayed by the device 19 may be viewed through an eye piece or frame 21. In the recording mode of the apparatus 10, the input 20 of the display device 19 is connected to the output 16 of the camera 13 so that the display device 19 can be used as a viewer for the camera 13 in the pickup and recording of video information.

The video recording apparatus 12 has an input 23 to which the output 17 of the camera 13 is connected in the recording mode of the apparatus 10. In this manner, video and synchronization signals generated by the camera 13 are recorded in the apparatus 12.

A switching element 24 on the recording apparatus 12 has a first position shown in FIG. 1 and indicating the recording mode of operation, and a second position shown in FIG. 2 and indicating the playback or reproducing mode of operation of the apparatus 12. The recording and playback apparatus 12 has an output 25 at which reproduced video information appears in the playback mode of operation.

In the playback mode of operation of the apparatus 10, the camera 13 is optically coupled to the viewer 19 by means of a transfer lens system 26 which is interposed between the camera objective 14 and the display surface of the viewer 19. The output 25 of the playback apparatus 12 is connected to the input 20 of the viewer 19 by a lead 27 whereby the viewer 19 displays the reproduced video information. This reproduced video information may either be video information that has been recorded with the apparatus in the recording mode of operation shown in FIG. 1, or video information that has been prerecorded on a recording medium prior to the sale or distribution thereof.

The camera 13 picks up the displayed reproduced video information through the lens system 14 and 26 and generates electric signals at the camera output 16 which contain the displayed reproduced video information, as well as accompanying synchronization signals.

In the preferred embodiment shown in FIG. 2, the reproduced video information is displayed by a video display set 31 which may be a conventional television receiver having input or antenna terminals 32. More specifically, the reproduced video signals appearing at the camera output 16 are in FIG. 2 applied by a lead 33 to the input 34 of a radio-frequency modulator 36. The modulator 36 is of a conventional design and serves to modulate the reproduced video information on a carrier to which the video receiving set 31 is tunable. The radio frequency modulator 36 has an output 37 which is coupled to the input or antenna terminal 32 of the display set 41.

The system according to the subject invention shown in FIGS. 1 and 2 utilizes the video camera 13 as an input and output device for the recording and reproducing apparatus 12. Similarly, the display device 19 is used as a viewer during recording and as an output device of the apparatus 12 during playback. Resultant benefits include a reduction of wow and flutter and improvement in resolution in the reproduced video information, as well as a reduction in the bandwidth requirements of the recording apparatus 12.

In the preferred embodiment of FIGS. 1 and 2, the viewer 19 has been shown movable from the position shown in FIG. 1 to the position illustrated in FIG. 2. This is, indeed, within the ambit of the subject invention. On the other hand, a different version is shown in FIG. 3.

Figure 3:
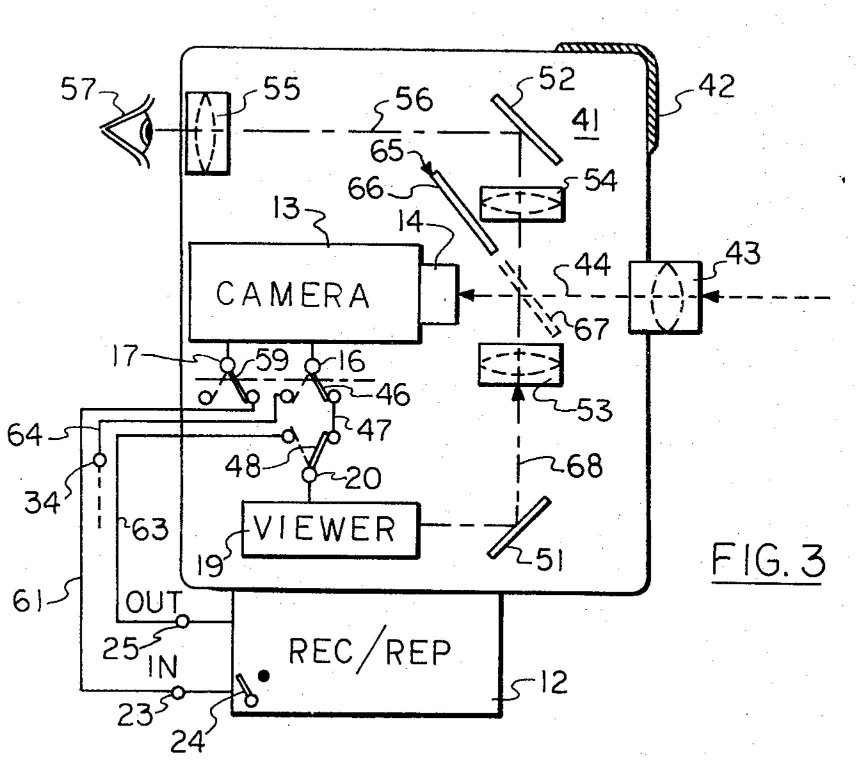
FIG. 3 is a block diagram of a modification of the methods and equipment of FIGS. 1 and 2.

According to FIG. 3 the camera 13 and the viewer 19 are mounted on a base 41 and are contained in a housing, part of which is illustrated at 42. An objective lens system 43 provides a first optical path 44 for video information to the video camera 13 preparatory to and during generation of the electric video signals to be recorded by the apparatus 12. As shown in FIG. 3, a switch 46, a lead 47 and a switch 48 couple the camera output 16 to the viewer input 20 during the recording mode of the illustrated equipment. The viewer 19 thus displays the video information picked up by the camera 13. Mirrors 51 and 52, transfer lens systems 53 and 54 and an eye piece 55 provide a second optical path 56 for displayed video information from the viewer 19 to the eye 57 of an observer or operator. In this manner, the video information picked up by the camera 13 may be readily viewed by the operator.

A switch 59 and a lead 61 couple the camera output 17 to the recorder input 23 in the recording mode of operation. The apparatus 12 is then operative to record the video information picked up by the camera 13.

To prepare the apparatus of FIG. 3 for the recording mode of operation, the switching element 24 is switched to the position shown in FIG. 2 whereby the apparatus 12 is operative as playback equipment. The switches 46, 48 and 59, which may be ganged, are switched to their dotted positions so that the viewer input 20 is connected to the recorder/reproducer output 25 by way of a lead 63 and so that the camera output 16 is connected to the radio-frequency modulator input 34 (see FIG. 2) by way of a lead 64. A mirror 65 which has a reflective surface 66 is then inserted in the optical path 44 and 56 as shown in dotted outline at 67. This establishes a third optical path 68 from the viewer 19 by way of the mirror 51, transfer lens system 53 and inserted mirror 65 to the camera objective 14. The mirror 65 may be ganged with the switches 46, 48 and 59 as well as with the switching element 24 so that the mirror 65 is automatically advanced to the position 67 in the playback mode and is automatically positioned in the solidly illustrated position in the recording mode.

The chief advantages of the system shown in FIG. 3 are ease of handling, compactness of construction and high quality of operation.

The system of FIGS. 1 and 2 is easily adaptable to an automatic and effective correction of flutter, wow and other timing errors. This will now be disclosed with the aid of FIGS. 4 and 5.

Figure 4:
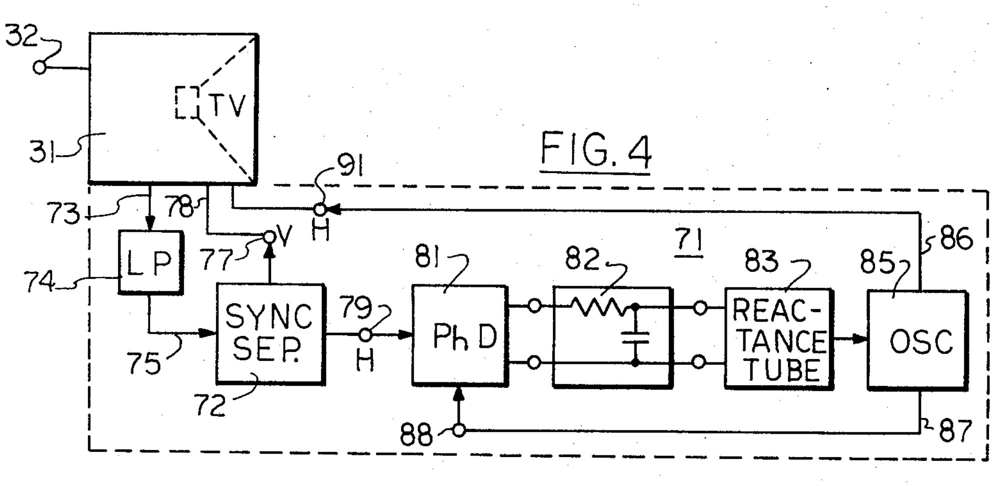
FIG. 4 is a block diagram of equipment that may be employed in the practice of the subject invention.

According to FIG. 4 the video display device 31 shown in FIG. 2 has an automatic frequency control 71 of a type typically employed in conventional television receiving sets. The automatic frequency control (AFC) 71 is preceded by a sync separator 72. The output of a conventional video amplifier in the set 31 is applied via a lead 73 to a low-pass filter 74 which removes video and high-frequency noise and applies the video synchronization information via a lead 75 to the sync separator 72. The sync separator operates in a conventional manner to separate the vertical and horizontal sync signals. The vertical signals appear at an output terminal 77 and are applied via a lead 78 to the vertical deflection apparatus of the display device 31. The horizontal sync signals appear at a terminal 79 and are applied to a conventional phase detector 81. The output of the phase detector 81 is applied to an integrator 82 and thence to a reactance tube 83. The reactance tube 83 is connected to a voltage-controlled oscillator 85 to control the oscillator frequency at output leads 86 and 87. The lead 87 is connected to a second input 88 of the phase detector 81. The output of the phase detector thus corresponds to the difference between the frequency of the signal applied through the terminal 79 and the frequency of the signal through the terminal 88.

In accordance with conventional practice the automatic frequency control 71 in effect measures the average type of arrival of horizontal sync pulses and corrects the phase of the local oscillator 85 to agree with the average. The corrected horizontal sync signals are applied via the lead 86 and terminal 91 to the horizontal deflection apparatus of the display device 31. The necessity and beneficial effect of automatic frequency control are well known in the television field. However, I have discovered and experimentally verified that the effect of flutter and wow and other timing errors would be enhanced if the reproduced signal were applied in the first instance to a display device of the type shown in FIG. 4 having an automatic frequency control.

In practice, flutter, wow and other timing errors in recorded and reproduced video signals are practically unavoidable and can only be minimized at high cost and equipment complexity. Accordingly, video information played back by the apparatus 12 typically contains unavoidable timing errors. If this information were applied to the display device 31, the automatic frequency control 71 would attempt to integrate the horizontal sync signals to provide a substantially constant frequency sync signal based on the average frequency of the incoming horizontal signals. In consequence, the accompanying video information would not modulate the beam of the video display tube at the proper time.

The subject system incorporates a solution to this problem which is characterized by considerable simplicity.

Figure 5:
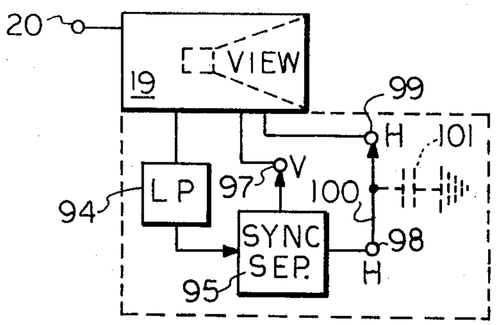
FIG. 5 is a block diagram of equipment that may be employed in the practice of the subject invention.

As shown by way of example in FIG. 5, the video display device or viewer 19 also shown in FIGS. 1 and 2 has a low-pass filter 94 and a sync separator 95 which correspond to the low-pass filter 74 and sync separator 72 shown in FIG. 4. As before, the output of the video amplifier is applied via the low-pass filter 94 to the sync separator 95. The separated vertical synchronization information appears at a terminal 97 which corresponds to the terminal 77 shown in FIG. 4. The separated horizontal sync information appears at a terminal 98 which corresponds to the terminal 79 shown in FIG. 4. The terminal 79 is connected to the vertical deflection apparatus of the viewer 19. This viewer also has a terminal 99 through which horizontal synchronization information is received to be applied to the horizontal deflection apparatus of the viewer 19.

In accordance with the preferred embodiment illustrated in FIG. 5, the terminal 98 is directly connected to the terminal 99 by a lead 100. In this manner, an automatic frequency control of the type illustrated at 71 in FIG. 4 is eliminated. If desired, a small capacitor 101 may still be employed at the lead 100 for filtering and similar purposes as long as the timing errors in the played-back synchronization information are essentially preserved.

In accordance with the embodiment shown in FIG. 2, the reproduced video information including synchronization signals affected by timing errors is applied to the viewer input terminal 20. Because of the presence of the lead 100 in lieu of an automatic frequency control, the timing errors in the played-back synchronization information are preserved and the display of the reproduced video information by the viewer 19 is synchronized and played-back synchronization information containing the mentioned timing errors. In this manner, and because of the negligible integrating effect of the capacitor 101 (if used at all), the horizontal sweep in the display tube of the viewer 19 always starts at the time the corresponding video information begins, and there is not loss of step in the video display. The display by the viewer 19 is thus substantially free of integrated wow and flutter effects.

Accordingly, the camera 13, when optically coupled to the viewer 19 as shown for example in FIG. 2, looks at a stable display of the reproduced video information. Since the operation of the camera 13 is practically free of flutter and wow, the display by the video set 31 is also free of those undesirable effects. Timing errors, if any, in the synchronization information provided by the camera 13 would be readily averaged by the automatic frequency control 71 shown in FIG. 4.

It will now be recognized that the subject invention provides a simple and effective solution to a complex and chronic problem. The system just disclosed with the aid of FIGS. 4 and 5 may be employed not only in the system shown in FIGS. 1 and 2 but also in other equipment where reproduced video information is displayed.

Another problem besetting systems of the type herein disclosed is the bandwidth problem. For instance, it is well known that adequate bandwidths for recording and reproducing video information are only achieved at a high price in terms of equipment precision, complexity and cost. Even for black and white recording and reproduction, the bandwidth of the recording and playback system should be in the order of 3 MHz. On the other hand, very considerable savings in equipment complexity and cost could be realized if a bandwidth of some 1.5 to 2.5 MHz were tolerable.

The subject invention provides a solution to the latter problem as will presently be disclosed.

Briefly, and in accordance with one preferred embodiment, the video camera 13 is operated at a first scanning rate during generation of electric video signals which represent video information picked up in the recording mode (see FIG. 1). The viewer 19 is operated at that first scanning rate during the display of the reproduced video information (see FIG. 2) and the video camera 13 is then operated at a second scanning rate which is higher than the first scanning rate. In brief, the video camera 13 is operated at a higher scanning rate during playback than during recording. The video display set 31 is operated at the higher scanning rate during the display of the reproduced video information.

To enable the video camera 13 to operate at different scanning rates, the camera may be equipped with a couple of conventional vertical sync generators and a couple of horizontal sync generators.

Figure 6:
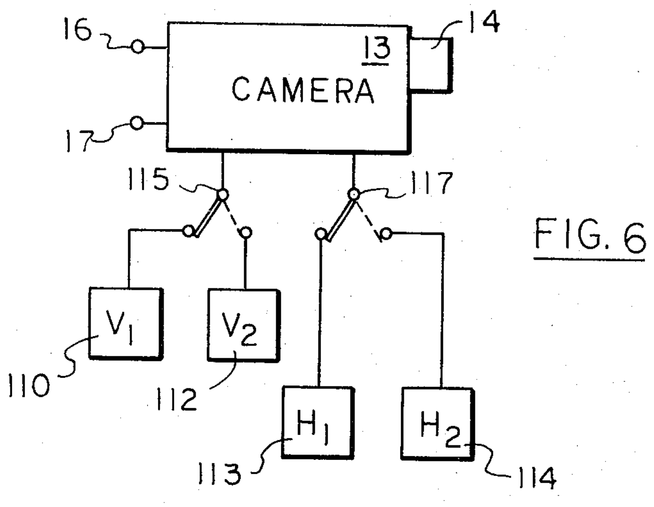

By way of example and as shown in FIG. 6, the camera 13 is equipped with a first vertical sync generator 110 and a second vertical sync generator 112, as well as a first horizontal sync generator 113 and a second horizontal sync generator 114. A switch 115 permits the camera 13 to be operated either at the scanning rate of the first vertical sync generator 110 or at the scanning rate of the second vertical sync generator 112. Similarly, a switch 117 permits the camera 13 to operate either at the scanning rate of the first horizontal sync generator 113 or at the scanning rate of the second horizontal sync generator 114. As mentioned above, the sync generators are typically of conventional design. Also, it is not absolutely necessary in practice to have physically separate sync generators, as it is well known to provide one and the same sync generator with switchable components for achieving the desired different scanning rates.

In practical systems the second vertical sync generator 112 would have a higher scanning rate in fields per second than the first vertical sync generator 110. Similarly, the second horizontal sync generator 114 would have a higher scanning rate than the first horizontal sync generator 113.

Figure 7:
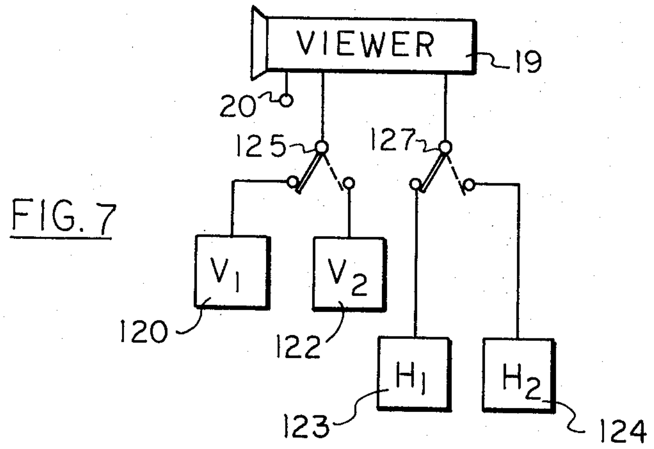

In accordance with an embodiment shown in FIG. 7, the viewer 19 is equipped with a first vertical sync generator 120 and with a second vertical sync generator 122. Similarly, the viewer 10 is also equipped with a first horizontal sync generator 123 and a second horizontal sync generator 124. A switch 125 permits the viewer to operate either at the scanning rate of the first vertical sync generator 120 or at the scanning rate of the second vertical sync generator 122. Similarly, a switch 127 permits the viewer to operate either at the scanning rate of the first horizontal sync generator 123 or at the scanning rate of the second horizontal sync generator 124.

By way of example and not by way of limitation, the scanning rate of the generator 112 may be twice the scanning rate of the generator 110 and the scanning rate of the generator 114 may be twice the scanning rate of the generator 113. Similarly, the scanning rate of the generator 122 may be twice the scanning rate of the generator 120 and the scanning rate of the generator 124 may be twice the scanning rate of the generator 123.

An example of a system according to an embodiment of the invention operating with different vertical and horizontal scanning rates will now be disclosed. For this purpose it is assumed that the second video display device 31 is a television receiver which operates at a vertical scanning rate of 60 fields per second and 30 frames per second. This corresponds to the NTSC standard. Suitable examples for other television standards may readily be derived from the subject disclosure. Under our present example, the vertical sync generators 110 and 120 operate at a scanning rate of 30 fields or 15 frames per second. This is one-half the standard. The sync generators 112 and 122 operate at the standard scanning rate of 60 fields or 30 frames per second.

A similar adjustment may be effected in the horizontal scanning rate. For instance, it is known that the horizontal scanning rate in the NTSC system is 15,750 lines per second. Suitable examples for other television standards may readily be derived from this disclosure. Under our present example, the horizontal sync generator 113 would operate at a scanning rate of 7,875 lines per second, which is one-half the standard. The horizontal sync generator 114 would operate at the standard 15,750 lines per second. Similarly, the horizontal sync generator 123 would operate at the scanning rate of 7,875 lines per second, while the horizontal sync generator 124 would operate at the standard 15,750 lines per second. The switches 115 and 117 may be ganged with each other, and the switches 125 and 127 may also be ganged with each other.

In the recording mode shown in FIG. 1, the switches 115 and 117 are in their solidly illustrated positions shown in FIG. 6 so that the camera 13 is operated at one-half standard scanning rate. This effectively permits the bandwidth of the recording and playback apparatus 12 to be one-half of what would be required at a standard scanning rate.

It is understood in this connection that statements herein made as to bandwidth are also intended to indicate an inverse change in resolution. For instance, instead of reducing the bandwidth of the recording and playback apparatus by one-half, it would be possible to increase the resolution of the recorded and played-back signal by two, or to reduce the bandwidth by less than one-half and to increase the resolution of the recording and playback system by less than two.

The switches 115 and 117 being in the solidly illustrated position shown in FIG. 6, the video information is picked-up and is recorded at one-half standard scanning rate. During video recording, the viewer 19 is operated at the same scanning rate as the camera 13 so as to be able to display the picked-up video information to the operator.

More importantly, the viewer 19 during playback of the recorded video information is operated at the same scanning rate as the camera 13 was operated during the recording of the signal.

For instance, the switches 125 and 127 are in their solidly illustrated positions shown in FIG. 7 during the display by the viewer 19 of the reproduced video information which is being played back by the apparatus 12. In this manner, the viewer 19 is capable to display the reproduced video information essentially in the form in which the camera saw it during recording. The system shown in FIGS. 6 and 7 has utility of its own, but is preferably used in combination with the system illustrated in FIGS. 1, 2 and 5. In this manner, it is assured that the camera 13 will look at a stable picture during the video information reproduction process illustrated in FIG. 2.

At that juncture, the switches 115 and 117 are in their dotted positions shown in FIG. 6 so that the camera 13 operates at standard scanning rate during playback of the video information. This renders the camera 13 compatible with the television receiving set 31.

The sync generators 122 and 124 are not normally employed in the embodiment just described. They may, however, be provided as shown in FIG. 7 to enable the viewer 19 to operate at standard scanning rate in those cases in which the camera 13 is being operated at standard rate in the pick-up of video scenes or in the recording of video information.

In testing the embodiment thus described, I have discerned a certain brightness fidelity problem. In particular, the different vertical scanning rates employed necessitate a special digression of the electron beams of the camera 13 and viewer 19 relative to each other. If phosphores with a finite brightness decay time are used in the viewer 19, this means that the brightness of the image picked up by the camera 13 during playback will be a function of scanning time rather than only a function of video information. Where this presents a problem, it is advantageous to employ a display device in the viewer 19 that operates in the nature of a conventional storage tube that provides little decay coupled with an erasability of the stored information. Also, since the brightness decays under consideration are a predictable function of scanning time, it is within the realm of the skill in the art to provide a brightness control having a cancelling time function.

A yet further preferred embodiment of the subject invention which avoids the brightness problem and is superior in other respects will presently be disclosed.

In accordance with this preferred embodiment, the vertical scan rate will remain standard, such as 60 fields per second under the NTSC system. However, the horizontal scan rate is reduced. While such reduction is not limited to any particular factor, I presently prefer a reduction by two-thirds, resulting in a reduced scan rate of 10,500 lines per second.

Figure 9:
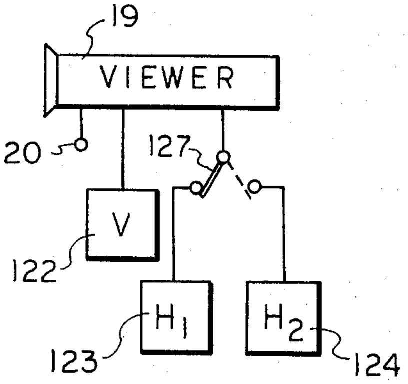
FIGS. 6 to 9 are block diagrams of further equipment that may be employed in the practice of the subject invention.
Figure 8:
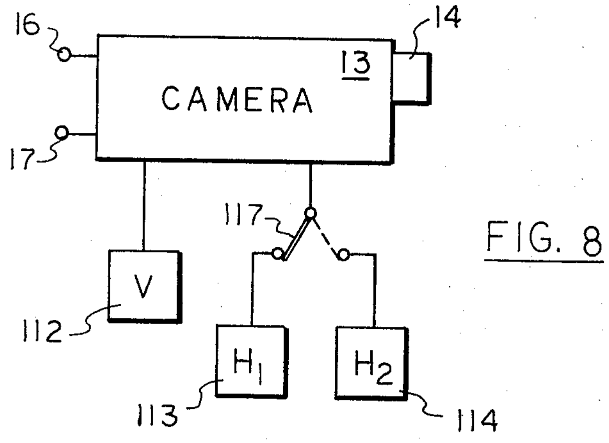

Equipment for implementing this preferred embodiment is shown in FIGS. 8 and 9.

As seen from a comparison of FIGS. 6 and 8, the switch 115 and vertical scan generator 110 are no longer needed since the vertical scan rate of the camera 13 is the same during recording and playback in the practice of the currently disclosed embodiment. Accordingly, the camera 13 need only be equipped with one vertical scan generator 112 operating at the standard vertical scan rate. The horizontal scan generator 114 operates at standard horizontal scan rate, while the horizontal scan generator 113 operates in the currently disclosed preferred embodiment at a scan rate equal to two-thirds of the standard horizontal scan rate.

During video information recording, the switch 117 is in the solidly illustrated position so that the camera 13 operates at two-thirds horizontal scan rate and standard vertical scan rate during the taking of video information to be recorded as shown in FIG. 1, for instance.

As shown in FIG. 9, the viewer 19 need only be equipped with one vertical scan generator 122 that operates at standard vertical scan rate. On the other hand, a horizontal scan generator 123 is employed which operates at two-thirds horizontal scan rate. The horizontal scan generator 124 operates at standard horizontal scan rate as before. During playback of the recorded video information (see for instance FIG. 2), the switch 127 is in the solidly illustrated position so that the viewer 19 is operated during playback at the same scan rate as the camera 13 was operated during recording. The switch 127 and the horizontal scan generator 124 may again be omitted unless the camera 13 is desired to be operated at normal scan rate for purposes other than video recording or for video recording with high-bandwidth equipment.

During playback, the camera 13 is operated at standard vertical scan rate and standard horizontal scan rate. For the latter purpose, the switch 117 is actuated to its dotted position shown in FIG. 8. In this manner, the video and synchronization information provided by the camera 13 is suitable for display by the standard television set 31.

Tests have confirmed that the preferred embodiment just disclosed avoids objectionable brightness variations in the ultimately displayed image and operates not only with standard field interlace but also with random interlace as well as with systems or equipment that provide no interlace. This preferred embodiment of the subject invention moreover reduces the recording and playback equipment bandwidth requirements, or increases the resolution of the recording and playback process, or extends the available playing time, or yields any combination of these benefits.

On the basis of conventional opinion in the video recording and playback field one would indeed assume that these advantages could only be realized at the expense of a substantial sacrifice in image resolution. This, surprisingly, is however not the case as will presently be shown and as has been confirmed by experiment.

For the purpose of analysis, the vertical and horizontal image resolutions will herewith be considered individually.

Though the NTSC standard provides for 525 horizontal lines per frame, only 490 lines occur outside the synchronization blanking intervals. Moreover, when the scanning beam spot lands on an intersection of a black and white image area on the camera target, some resolution is lost because the camera cannot simultaneously provide signals for both black and white image elements. The loss factor associated with this drawback is called the Kell factor, which may be expressed as about 0.7.

Accordingly, the vertical resolution, $R_v$, for an NTSC standard interlaced system is in reality;

$$R_v = 490 \cdot 0.7 = 343 \text{ lines} \tag{1}$$

In the horizontal dimension, the scan period for one line is 63.5 microseconds in the NTSC system. Ten microseconds of this time are used for horizontal blanking, leaving 53 microseconds for display purposes. In a television picture, resolution is traditionally referred to in lines and is referred to the picture height. Since there is a four-to-three aspect ratio, the latter display time is equivalent to only a 40 microseconds useful display time.

An NTSC standard black and white broadcast system has a bandwidth in the order of 4 MHz. For each horizontal line there are, therefore, 160 cycle available for resolution in terms of useful display time, as may be seen from the following:

$$4 \text{ MHz} \cdot 40 \text{ microseconds} = 160 \text{ Hz} \tag{2}$$

According to standard resolution definition, both black and white lines are counted. One cycle of a sine wave then yields two lines of resolution.

Hence: 160 Hz = 320 lines

Accordingly, in a system limited to a bandwidth of 2 MHz, we could expect a horizontal resolution, $R_h$, of:

$$R_h = 1/2 \cdot 320 \text{ lines} = 160 \text{ lines} \tag{4}$$

This incomparison to the above mentioned vertical resolution of 343 lines.

It will be recalled at this juncture that the currently disclosed preferred embodiment of this invention leaves the vertical scan rate at the standard value (i.e., 60 fields per second in the NTSC system), but reduces the horizontal scan rate by two-thirds (i.e., from 15,750 to 10,500 lines per second in the NTSC system).

The requisite bandwidth, B, may be expressed as:

$$B = N/2 \cdot Y/a(1\text{-}h) \tag{5}$$

wherein:
N = number of lines
Y = line rate
$a$ = aspect ratio
$h$ = horizontal blanking interval This may be resolved into N as:

$$N = 2aB(1\text{-}h)/Y \tag{6}$$

N may also be expressed as:

$$N = kY(1\text{-}v)/f \tag{7}$$

wherein:
k = Kell factor
Y = line rate
$v$ = vertical blanking interval
$f$ = frame rate Equating (6) and (7) and resolving for Y, we obtain:

$$Y^2 = 2afB(1\text{-}h)/k(1\text{-}v) \tag{8}$$

Assuming by way of example a bandwidth of 2 MHz, an aspect ratio of three-fourths, a frame rate of 30, a Kell factor of 0.7, a horizontal blanking interval of 0.17, and a vertical blanking interval of 0.08, we obtain approximately:

$$Y = 10.5 \text{ kHz} \tag{9}$$

and $$N = 10.5 \text{ kHz}/30 = 350 \text{ lines} \tag{10}$$

The horizontal resolution may then be expressed as:

$$R_h = 2aB(1\text{-}h)/Y \tag{11}$$

or, $$R_h = 237 \text{ lines} \tag{12}$$

The vertical resolution is then, $$R_v = Nk(l\text{-}v) \tag{13}$$

or, $$R_v = 350 \cdot 0.7 \cdot 0.92 = 225 \text{ lines} \tag{14}$$

It is thus seen that the currently disclosed preferred embodiment of my invention equalizes horizontal and vertical resolution. The relatively poor horizontal resolution of conventional systems is not sacrificed further, but is rather improved by the subject invention. The vertical resolution is brought into line with the improved horizontal resolution.

It will now be recognized that the subject invention provides several substantial advances in the video recording and/or playback field.

Modifications and variations within the spirit and scope of the invention will become apparent or suggest themselves to those skilled in the art on the basis of the subject invention.

I claim:

1. In a method of recording and subsequently displaying video information, the improvement comprising in combination the steps of:
- providing an apparatus for recording and reproducing video information contained in electric signals;
- providing a first video display device;
- providing a second video display device separate from said first video display device;
- providing a video camera;
- employing said video camera for generating first electric signals containing video information;
- employing said first video display device for viewing said video information during generation of said first electric signals;
- employing said apparatus for recording said video information contained in said first electric signals;
- employing said apparatus for subsequently reproducing said recorded video information;
- employing said first video display device for displaying said reproduced video information;
- employing said video camera for generating second electric signals substantially containing said displayed reproduced video information; and
- employing said second video display device for displaying said video information contained in said second electric signals.

2. A method as claimed in claim 1, including in said combination the steps of:
- providing a first optical path for video information to said video camera preparatory to and during generation of said first electric signals;
- providing a second optical path for video information from said first video display device to the eye of an observer during generation of said first electric signals; and
- providing a third optical path from said first video display device to said video camera preparatory to and during reproduction of said recorded video information.

3. A method as claimed in claim 1, including the steps of:
- providing said first electric signals with video synchronization information;
- recording and subsequently reproducing said video synchronization information whereby timing errors are produced in said synchronization information;
- employing said synchronization information with said timing errors to synchronize said first video display device during the display of said reproduced video information;
- providing said second electric signals with video synchronization information;
- providing said second video display device with an automatic frequency control system for averaging timing errors in said synchronization information in said second electric signals;
- employing said automatic frequency control system for averaging timing errors in said synchronization information in said second electric signals; and
- employing said synchronization information with said averaged timing errors to synchronize said second video display device during the display of said video information contained in said second electric signals.

4. A method as claimed in claim 1, wherein:
- said first scanning rate is a first horizontal scanning rate; and
- said second scanning rate is a second horizontal scanning rate being higher than said first horizontal scanning rate.

5. A method as claimed in claim 1, wherein:
- said video camera is operated at a first scanning rate during generation of said first electric signals;
- said first video display device is operated at said first scanning rate during display of said reproduced video information;
- said video camera is operated at a second scanning rate, being higher than said first scanning rate, during generation of said second electric signals; and
- said second video display device is operated at said second scanning rate during display of said video information contained in said second electric signals.

6. A method as claimed in claim 5, wherein:
- said first scanning rate is a first vertical scanning rate in fields per second; and
- said second scanning rate is a second vertical scanning rate in fields per second, being higher than said first vertical scanning rate.

7. A method as claimed in claim 1, wherein:
- said video camera is operated at a first horizontal scanning rate and at a first vertical scanning rate during generation of said first electric signals;
- said first video display device is operated at said first horizontal scanning rate and at said first vertical scanning rate during display of said reproduced video information;
- said video camera is operated at a second horizontal scanning rate and at said first vertical scanning rate during generation of said second electric signals, said second horizontal scanning rate being higher than said first horizontal scanning rate; and
- said second video display device is operated at said second horizontal scanning rate and at said first vertical scanning rate during display of said video information contained in said second electric signals.

8. A method as claimed in claim 7, wherein:
- said first scanning rate is made substantially equal to two-thirds of said second scanning rate.

9. In a method of recording and subsequently displaying video information, the improvement comprising in the combination the steps of:
- providing an apparatus for recording and reproducing video information contained in electric signals;
- providing a first video display device;
- providing a second video display device separate from said first video display device;
- providing a video camera;
- employing said video camera for generating first electric signals containing video information and operating said video camera at a first scanning rate during generation of said first electric signals;
- employing said apparatus for recording said video information contained in said first electric signals;
- employing said apparatus for subsequently reproducing said recorded video information;
- employing said first video display device for displaying said reproduced video information and operating said first video display device at said first scanning rate during display of said reproduced video information;

employing said video camera for generating second electric signals substantially containing said displayed reproduced video information and operating said video camera at a second scanning rate, being higher than said first scanning rate, during generation of said second electric signals; and employing said second video display device for displaying said video information contained in said second electric signals and operating said second video display device at said second scanning rate during display of said video information contained in said second electric signals.

10. A method as claimed in claim 9, wherein:

said first scanning rate is a first vertical scanning rate in fields per second; and said second scanning rate is a second vertical scanning rate in fields per second, being higher than said first vertical scanning rate.

11. A method as claimed in claim 9, wherein:

said first scanning rate is a first horizontal scanning rate; and said second scanning rate is a second horizontal scanning rate being higher than said first horizontal scanning rate.

12. A method as claimed in claim 9, wherein:

said video camera is operated at a first horizontal scanning rate and at a first vertical scanning rate during generation of said first electric signals;

said first video display device is operated at said first horizontal scanning rate and at said first vertical scanning rate during display of said reproduced video information;

said video camera is operated as a second horizontal scanning rate and at said first vertical scanning rate during generation of said second electric signals, said second horizontal scanning rate being higher than said first horizontal scanning rate; and said second video display device is operated at said second horizontal scanning rate and at said first vertical scanning rate during display of said video information contained in said second electric signals.

13. A method as claimed in claim 12, wherein:

said first scanning rate is made substantially equal to two-thirds of said second scanning rate.

14. In apparatus for recording video information and subsequently displaying said video information with a video display apparatus, the improvement comprising in combination:

means for recording and reproducing video information contained in electric signals;

a video display device separate from said video display apparatus;

a video camera for generating first electric signals containing video information;

means for selectively connecting said video display device to said video camera for a display of said video information during generation of said first electric signals;

means for selectively connecting said recording means to said camera for a recording of said video information contained in said first electric signals;

means for switching said recording means to a reproducing mode of operation for reproducing said recorded video information;

means for selectively connecting said video display device to said recording means for a display of said reproduced video information by said video display device;

means for optically coupling said video camera to said video display device for generating second electric signals substantially containing said displayed reproduced video information; and means for applying said second electric signal to said video display apparatus for a display of said video information contained in said second electric signals.

15. Apparatus as claimed in claim 14, including in said combination:

means providing a first optical path for video information to said video camera; and means for providing a second optical path for video information from said first video display device to the eye of an observer during generation of said first electric signals;

said optical coupling means including means for selectively providing a third optical path from said first video display device to said video camera.

16. Apparatus as claimed in claim 14, including in said combination:

means for providing said first electric signals with video synchronization information;

means for applying said video synchronization information to said recording means for recording and subsequently reproducing said video synchronization information whereby timing errors are produced in said synchronization information;

means for synchronizing said video display device during the display of said reproduced video information with said synchronization information including said timing errors; and means for providing said second electric signals with video synchronization information;

said video display apparatus having an automatic frequency control system for averaging timing errors in said synchronization information in said second electric signals.

17. Apparatus as claimed in claim 14, wherein:

said first scanning rate is a first horizontal scanning rate; and said second scanning rate is a second horizontal scanning rate being higher than said first horizontal scanning rate.

18. Apparatus as claimed in claim 14, including in said combination:

means for operating said video camera at a first scanning rate during generation of said first electric signals;

means for operating said video display device at said first scanning rate during display of said reproduced video information; and means for operating said video camera at a second scanning rate, being higher than said first scanning rate, during generation of said second electric signals;

said video display apparatus including means for operating said video display apparatus at said second scanning rate during display of said video information contained in said second electric signals.

19. Apparatus as claimed in claim 18, wherein:
said first scanning rate is a first vertical scanning rate in fields per second; and
said second scanning rate is a second vertical scanning rate in fields per second, being higher than said first vertical scanning rate.

20. A method as claimed in claim 14, including in said combination:
means for operating said video camera at a first horizontal scanning rate and at a first vertical scanning rate during generation of said first electric signals;

means for operating said video display device at said first horizontal scanning rate and at said first vertical scanning rate during display of said reproduced video information; and
means for operating said video camera at a second horizontal scanning rate and at said first vertical scanning rate during generation of said second electric signals, said second horizontal scanning rate being higher than said first horizontal scanning rate;
said video display apparatus including means for operating said video display apparatus at said second horizontal scanning rate and at said first vertical scanning rate during display of said video information contained in said second electric signals.

21. A method as claimed in claim 20, wherein:
said means for operating said video camera during generation of said first electric signals include means for operating said video camera at a first horizontal scanning rate being substantially equal to two-thirds of said second scanning rate, and for operating said video camera at said first vertical scanning rate; and
said means for operating said video display device include means for operating said video display device at a first horizontal scanning rate being substantially equal to two-thirds of said second scanning rate, and for operating said video camera at said first vertical scanning rate.

22. In apparatus for recording and subsequently displaying video information, the improvement comprising in combination:
means for recording and reproducing video information contained in electric signals;
a video camera for generating first electric signals containing video information;
means for operating said video camera at a first scanning rate during generation of said first electric signals;
a first video display device for displaying reproduced video information;
means for operating said first video display device at said first scanning rate during display of said reproduced video information;
means for optically coupling said video camera to said first video display device for a generation of electric signals substantially containing said displayed reproduced video information;
means for operating said optically coupled video camera at a second scanning rate, being higher than said first scanning rate, during generation of said second electric signals;
a second video display device for displaying said video information contained in said second electric signals; and
means for operating said second video display device at said second scanning rate during display of said video information contained in said second electric signals.

23. Apparatus as claimed in claim 22, wherein:
said means for operating said video camera at said first scanning rate include means for operating said video camera at a first vertical scanning rate in fields per second during generation of said first electrical signals;
said means for operating said first video display device at said first vertical scanning rate in fields per second during display of said reproduced video information;
said means for operating said optically coupled video camera at said second scanning rate include means for operating said optically coupled video camera at a second vertical scanning rate in fields per second, being higher than said first vertical scanning rate; and
said means for operating said second video display device at said second scanning rate include means for operating said second video display device at said second vertical scanning rate.

24. Apparatus as claimed in claim 22, wherein:
said means for operating said video camera at said first scanning rate include means for operating said video camera at a first horizontal scanning rate during generation of said first electric signals;
said means for operating said first video display device at said first scanning rate include means for operating said first video display device at said first horizontal scanning rate in fields per second during display of said reproduced video information;
said means for operating said optically coupled video camera at said second scanning rate include means for operating said optically coupled video camera at a second horizontal scanning rate being higher than said first horizontal scanning rate; and
said means for operating said second video display device at said second scanning rate include means for operating said second video display device at said second horizontal scanning rate.

25. Apparatus as claimed in claim 22, wherein:
said means for operating said video camera during generation of said first electric signal include means for operating said video camera at said first horizontal scanning rate and at a first vertical scanning rate during generation of said first electric signals;
said means for operating said first video display device include means for operating said first video display device at said first horizontal scanning rate and at said first vertical scanning rate during display of said reproduced video information;
said means for operating said video camera during generation of said second electric signals include means for operating said video camera at a second horizontal scanning rate and at said first vertical scanning rate during generation of said second electric signals, said second horizontal scanning rate being higher than said first horizontal scanning rate; and
said means for operating said second video display device include means for operating said second video display device a said second horizontal scanning rate and at said first vertical scanning rate during display of said video information contained in said second electric signals.

26. Apparatus as claimed in claim 25, wherein:

said means for operating said video camera at said first horizontal scanning rate include means for operating said video camera during generation of said first electric signal at a horizontal scanning rate being substantially equal to two-thirds of said second horizontal scanning rate; and said means for operating said first video display device at a first horizontal scanning rate include means for operating said first video display device at said horizontal scanning rate substantially equal to two-thirds of said second horizontal scanning rate.

* * * * *

7817

PO-1050
(5/69)

UNITED STATES PATENT OFFICE
CERTIFICATE OF CORRECTION

Patent No. 3,833,758 Dated September 3, 1974

Inventor(s) Leonard A. Ferrari

It is certified that error appears in the above-identified patent and that said Letters Patent are hereby corrected as shown below:

Column 1, line 16, "are" should be --and--. Column 1, line 38, "vieo" should be --video--. Column 2, line 54, "singals" should be --signals--. Column 4, line 49, "41" should be --31--. Column 7, line 8, "not" should be --no--. Column 8, line 18, "10" should be --19--. Column 11, line 56, "incomparison" should be --in comparison--. Column 18, line 12, --scanning rate include means for operating said first video display device at said first-- should be inserted after "first".

Signed and sealed this 12th day of November 1974.

(SEAL)
Attest:

McCOY M. GIBSON JR.
Attesting Officer

C. MARSHALL DANN
Commissioner of Patents